(12) United States Patent
Kaneko et al.

(10) Patent No.: US 8,505,405 B2
(45) Date of Patent: Aug. 13, 2013

(54) BALL SCREW APPARATUS AND ELECTRIC POWER STEERING APPARATUS

(75) Inventors: Tetsuya Kaneko, Okazaki (JP); Masayoshi Asakura, Okazaki (JP); Takashi Hara, Hamamatsu (JP)

(73) Assignee: JTEKT Corporation, Osaka (JP)

( * ) Notice: Subject to any disclaimer, the term of this patent is extended or adjusted under 35 U.S.C. 154(b) by 323 days.

(21) Appl. No.: 13/149,300

(22) Filed: May 31, 2011

(65) Prior Publication Data

US 2011/0296939 A1    Dec. 8, 2011

(30) Foreign Application Priority Data

Jun. 7, 2010  (JP) ................................ 2010-129947

(51) Int. Cl.
*F16H 1/18*    (2006.01)

(52) U.S. Cl.
USPC ................... 74/424.86; 74/424.83; 74/424.87

(58) Field of Classification Search
USPC .............. 74/424.75, 424.81, 424.82, 424.83, 74/424.86, 424.87
See application file for complete search history.

(56) References Cited

U.S. PATENT DOCUMENTS

| | | | |
|---|---|---|---|
| 2,959,978 A | | 11/1960 | Boutwell |
| 3,585,868 A | * | 6/1971 | Scott ............................ 74/424.9 |
| 4,177,690 A | * | 12/1979 | Klinkenberg .............. 74/424.86 |
| 5,295,407 A | * | 3/1994 | Hirose et al. .................. 74/89.37 |
| 7,024,958 B2 | * | 4/2006 | Kajita .......................... 74/424.86 |
| 7,080,571 B2 | * | 7/2006 | Watanabe et al. ........... 74/424.86 |
| 7,390,241 B2 | * | 6/2008 | Kajita .............................. 451/52 |
| 7,562,599 B2 | * | 7/2009 | Chen et al. .................. 74/424.86 |
| 8,336,415 B2 | * | 12/2012 | Miyahara et al. ........... 74/424.86 |
| 2002/0023513 A1 | | 2/2002 | Sekiya et al. |
| 2002/0073794 A1 | | 6/2002 | Ohkubo |

FOREIGN PATENT DOCUMENTS

| | | |
|---|---|---|
| DE | 101 40 884 A1 | 8/2002 |
| EP | 1 524 171 A2 | 4/2005 |
| JP | A-6-300108 | 10/1994 |
| JP | A-11-270648 | 10/1999 |
| JP | A-2010-71411 | 4/2010 |

OTHER PUBLICATIONS

Dec. 3, 2012 Communication issued in European Patent Application No. 11 168 231.6-2421.
Mar. 5, 2012 Extended Search Report issued in European Application No. 11168231.6.

* cited by examiner

*Primary Examiner* — David M Fenstermacher
(74) *Attorney, Agent, or Firm* — Oliff & Berridge, PLC

(57) ABSTRACT

The ball screw apparatus includes a returning way L2 by mounting a circulating member 15 in mounted holes 16, 17 formed in the ball screw nut 13. The ball screw nut 13 includes a base portion 51 and an expanding portion 52. In the base portion 50 a distance from an axis center O1 of the rack shaft 3 to a bottom portion 14a of the nut side screw groove 14 is constant, and in the expanding portion 52 the distance is larger than that of the base portion 51. The expanding portion 52 includes a connecting area 34.

15 Claims, 12 Drawing Sheets

BALL SCREW APPARATUS AND ELECTRIC POWER STEERING APPARATUS

INCORPORATION BY REFERENCE

The disclosure of Japanese Patent Application No. 2010-129947 filed on Jun. 7, 2010 including the specification, drawings and abstract, is incorporated herein by reference in its entirety.

BACKGROUND OF THE INVENTOIN

1. Field of the Invention

The present invention relates to a ball screw apparatus and an electric power steering apparatus.

2. Description of the Related Art

It is well known that there is a rack assisted electric power steering apparatus (EPS) having a hollow cylindrical shaft penetrated by a rack shaft and rotatably driven by a motor to transform rotational movement of the hollow cylindrical shaft to axial movement of the rack shaft by a ball screw apparatus, therefore assisting rotation of a steering wheel.

The conventional ball screw apparatus of the EPS includes a plurality of balls rotating in a spiral rotating way formed by facing a nut side screw groove formed on an inner peripheral surface the ball screw nut to a shaft side screw groove formed on an outer peripheral surface of the rack shaft. Each ball is put between the shaft side screw groove and the nut side screw groove in the rotating way to be rotated in the rotating way by load due to a relative rotation of the ball screw nut relatively to the rack shaft. The ball screw apparatus includes a returning way connecting one end and the other end of the rotating way. Each ball is circulated through the returning way from one of end to the other end of the rotating way after it has been rotated in the rotating way. The ball in the returning way does not receive any load on the contrary of receiving load in the rotating way. The ball dipped up to the returning way from the rotating way is moved to a ball circulating direction in the returning way by being pushed by next adjacent ball.

The prior ball screw apparatus constructed above transforms the rotation of the ball screw nut to the axial movement of the rack shaft by endlessly circulating each ball rotating in the rotating way through the returning way. The rack assisted EPS transmits the assisting force to the steering system by rotatably driving the ball screw apparatus with using the motor and transmitting the rotational torque to the axial pushing force to rack shaft.

The prior ball screw apparatus includes a circulating member as a deflector having function to dip up the ball from the rotating way in relative to a mounted hole penetrated the ball screw nut in radius direction, and function of re-discharge of the ball to the rotating way as disclosed in Tokkai 2010-71411. In the deflector type ball screw apparatus, however, it appears some steps on a jointing point between the rotating way and the returning way on a basis of figure accuracy of circulating member and assembling accuracy to assemble to the ball screw nut 13 etc. It generates any vibration or noise by clogging the ball circulated in the rotating way and the returning way due to the steps. It is therefore disclosed a prior art that the steps are machined to be ground to minimum at the jointing point between the rotating way and the returning way as disclosed in Tokkai-Hei 11-270648.

It is disclosed in another prior ball screw apparatus of Japanese Patent 3381735 that a ball nut (20) is extended in axial direction when load acting on the ball nut (20) is increased to the axial direction thereby to contact the ball (30) with a ball screw groove (24) located to be apart far from a fixed flange (25). By this construction the ball screw apparatus in the Japanese Patent 3381735 has the axial load evenly over full stroke of the screw groove because all of the ball contact with any portion of the screw groove even predetermined high load acts on the ball nut (20). Numerals in ( )indicate that of members in the Japanese Patent 3381735.

However, it should be happened in the ball screw apparatus that moving direction of the ball is rapidly changed near the jointing point between the rotating way and the returning way when the ball is dipped up from the rotating way to be entered into the returning way. In adding to this point, it should be also happened that each ball is rotated with the load in the rotating way and the load acted on the ball does not act in the returning way. Therefore, when the ball is discharged into the rotating way from the returning way, two points should be simultaneously happened that the moving direction is suddenly changed and the load acted on the ball is increased rapidly so that clogging the ball is easily happened near the jointing point between the rotating way and the returning way.

The ball screw apparatus in the Japanese Patent 3381735 has the phenomenon that every ball contacts with every point of the screw groove by the axial load having over the predetermined amount to the ball nut. It tends for the ball screw apparatus in the Japanese Patent 3381735 that the ball is easily clogged by rapidly increased load when the ball is discharged from the returning way. It tends also for the ball screw apparatus in the Japanese Patent 3381735 that a number of the ball contributing to transmit torque is changeable in dependent on small or large amount of the axial load acting on the ball nut. Especially when the axial load acting on the ball nut is small, it tends to be happened that efficiency of transmitting the torque is worse because of small numbers of the ball contributing to transmit the torque.

SUMMARY OF THE INVENTION

In view of the previously mentioned circumstances, it is an object of the present invention to provide a ball screw apparatus and an electric power steering apparatus to prevent the ball clogging and to make efficiency of transmitting torque high.

In order to achieve the above and other objects, one aspect of the present invention provides a ball screw apparatus mainly including a connecting area faced to a mounting hole in a nut side screw groove of a ball screw nut is machined to substantially eliminate possible steps at a jointing point of a rotating way and a returning way in the ball screw nut, and the ball screw nut having a base portion and an expanding portion, in the base portion a distance from an axis center of a screw shaft to a bottom portion of the nut side screw groove is constant, and in the expanding portion the distance is larger than that of the base portion. Thereby, since the aspect of the present invention includes the expanding portion having the larger distance of the bottom portion of the nut side screw groove from the axis center of the screw shaft, the load acting on the ball is not rapidly increased at the connecting area so that it can prevent the ball clogging effectively in the present invention.

The one aspect of the present invention includes the base portion as well as the expanding portion in the ball screw nut. The base portion has the constant distance from the axial center of the ball screw axis to the bottom portion of the nut side screw groove in order to rotate the ball with being sandwiched by the nut side screw groove and the shaft side screw groove. Therefore, the one aspect of the ball screw apparatus is constructed that the torque of the ball nut is firmly transmitted to the screw shaft by the base portion.

As explained above the ball screw apparatus in the prior art disclosed in the Japanese Patent 3381735 has a tendency that the number of the ball contributing to transmit the torque is changeable in dependent on small or large amount of the axial load acting on the ball screw nut. In general, the number of the ball contributing to transmit the torque relates to frictional force acted between the ball and the nut side screw groove and between the ball and the shaft side screw groove. When the number of the ball contributing to transmit the torque is increased the frictional force is increased, and when the number of the ball contributing to transmit the torque is decreased the frictional force is decreased. It tends in the ball screw apparatus of the Japanese Patent 3381735 that the torque of the ball screw nut is larger than the frictional force between the nut side screw groove and the ball when the axial force acting on the ball screw nut is small, that is the number of the ball contributing to transmit the torque is small. When the torque of the ball screw nut becomes larger than the frictional force between the nut side screw groove and the ball, it is happened to generate any slip between the nut side screw groove and the ball so that the torque transmitted from the ball screw nut to the screw shaft is reduced. In the ball screw apparatus of the Japanese Patent 3381735 it tends to be happened that numbers of the ball contributing to transmit the torque is reduced thereby to generate any delay or shift in response of the screw shaft when the axial load acting on the ball nut is small. The one aspect of the present invention includes the base portion where the ball rotated in the rotating way contributes to transmit the torque of the ball screw nut without any relationship to the amount of the axial load acted on the ball screw nut. The one aspect of the present invention can transmit the torque of the ball screw nut to the screw shaft efficiently and stably.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

First embodiment of a ball screw apparatus and an electric power steering apparatus according to the present invention will be described referred to FIG. 1 to FIG. 14.

Figure 1:
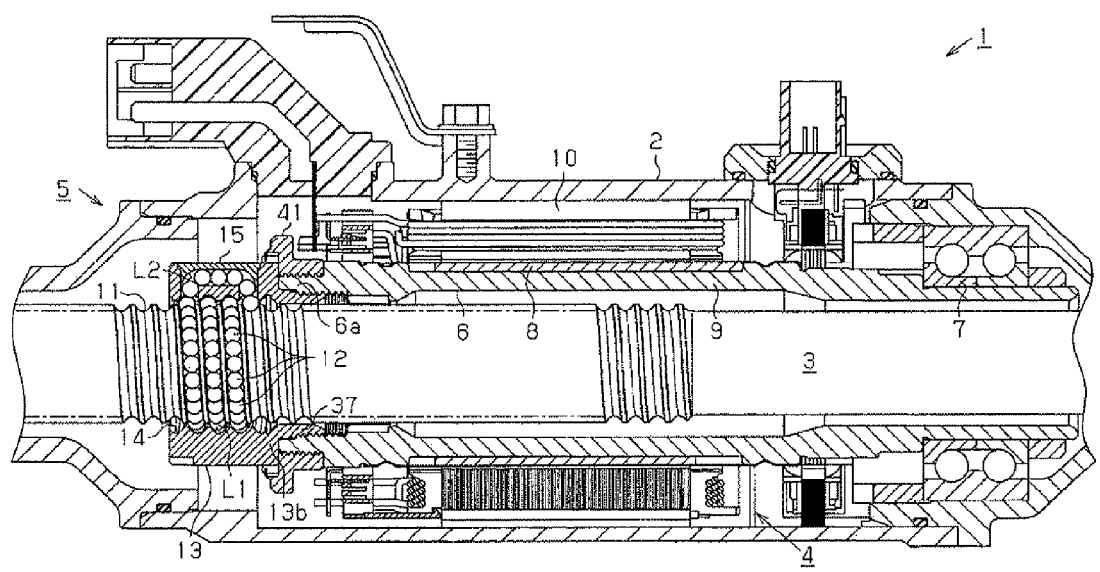
FIG. 1 is a schematic diagram explaining an electric power steering apparatus.

In an electric power steering apparatus 1 (referred to EPS hereinafter) shown in FIG. 1, a rack shaft 3 is penetrated through a housing 2 being approximately cylindrical, and accommodated and supported therein by an un-illustrated rack guide and an un-illustrated slide bearing for moving along an axis of the housing 2. The rack shaft 3 is movable according to operations of a steering wheel by being connected to a steering shaft through well-known rack and pinion mechanism. The EPS 1 includes a motor 4 as a driving source and a ball screw equipment 5 transmitting a rotational movement of the motor 4 by exchanging it to an axial movement of the rack shaft 3. The EPS 1 is constructed as the rack assisted EPS accommodating the rack shaft 3, the motor 4 and the ball screw equipment 5 as a function of a single body.

The motor 4 includes a motor shaft 6 formed to a hollow shaft. The motor shaft 6 is installed along an axial direction of the housing 2 by being supported with a bearing 7 mounted on an inner surface of the housing 2. A motor rotor 9 of the motor 4 is formed with a magnet 8 fixed to an outer peripheral surface of the motor shaft 6, The motor 4 is concentrically arranged with the rack shaft 3 within the housing 2 by the way that a motor stator 10 surrounding an outer peripheral surface of the motor rotor 9 is fixed to an inner surface of the housing 2 and the rack shaft 3 is inserted into the motor shaft 6.

The rack shaft 3 is constructed as a screw shaft by being formed a screw groove 11 on an outer circumferential surface of the rack shaft 3. The ball screw equipment 5 is constructed as a screw shaft by engaging a ball screw nut 13 in mesh with the rack shaft 3 through a plurality of balls 12.

Figure 2:
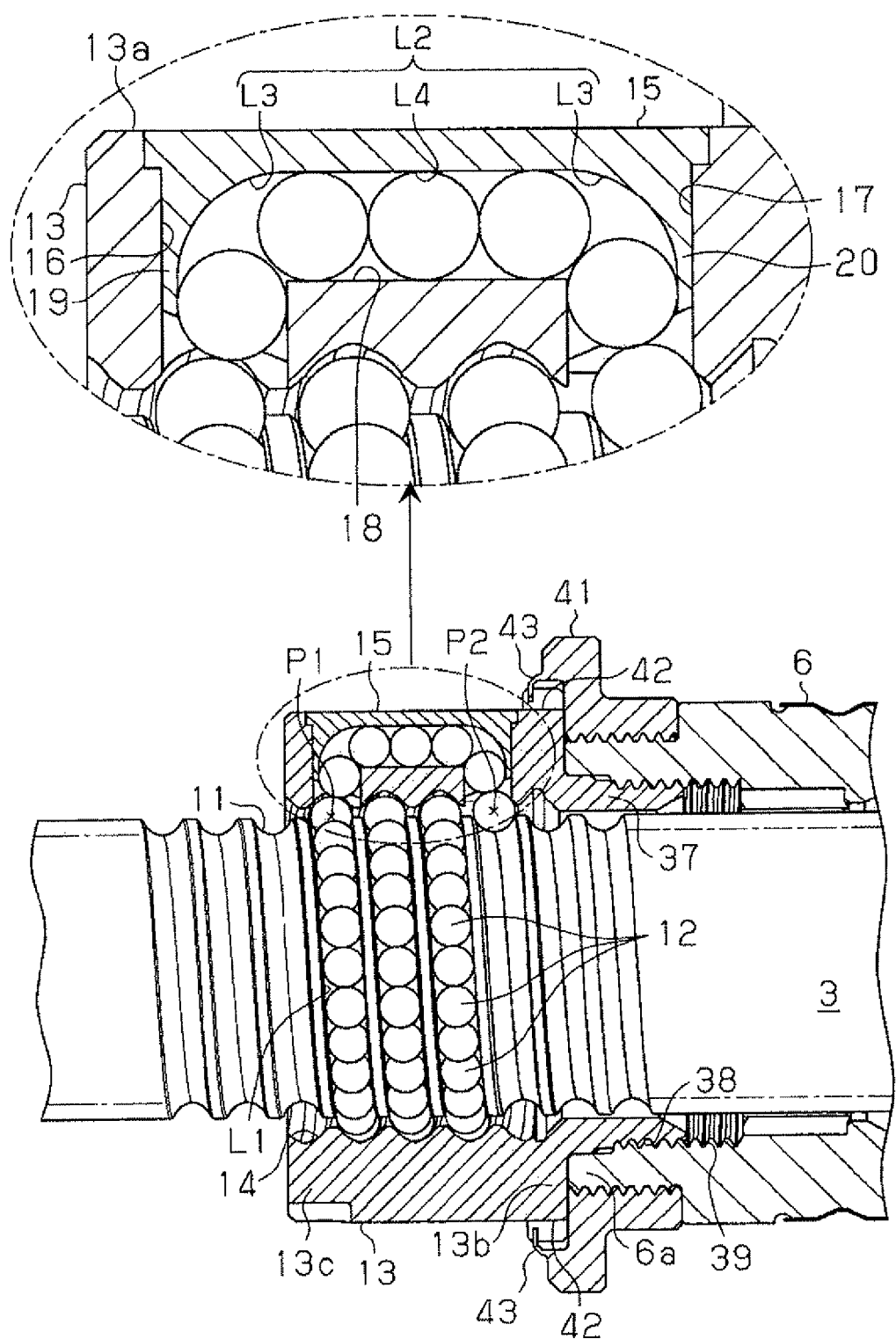
FIG. 2 is an enlarged sectional diagram of a ball screw apparatus and its vicinity.

In detail as shown in FIG. 2, a nut side screw groove 14 is formed on an inner peripheral surface of the ball screw nut 13. The nut side screw groove 14 corresponds to a shaft side screw groove 11 of the rack shaft 3. The ball screw nut 13 is formed to approximately cylindrical form and is fit the rack shaft 3 in a way that the nut side screw groove 14 of the ball screw nut 13 is faced to the shaft side screw groove 11 of the rack shaft 3 to form a spiral rotating way or line L1.

A returning way or line L2 is formed in the ball screw nut 13 to open to two connecting places P1, P2 in the nut side screw groove 14. The two connecting places P1, P2 of the rotating way L1 in the ball screw nut 13 are connected each other through the returning way L2.

Each of the plural balls 12 is put between the shaft side screw groove 11 of the rack shaft 3 and the nut side screw groove 14 of the ball screw nut 13 in the rotating way L1. Each ball 12 rotates in the rotating way L1 under receiving load by relative rotation of the ball screw nut 13 to the rack shaft 3 so that the rotation of the ball screw nut 13 is converted to an axial movement of the rack shaft 3, In detail, when the ball screw nut 13 rotates relatively to the rack shaft 3, torque of the ball screw nut 13 is transmitted to the ball 12 by frictional force generated between the nut side screw groove 14 and the ball 12 so that each ball 12 is rotated in the rotating way L1

During the rotation of the balls 12 in the rotating way L1, the balls 12 transmits the torque to the rack shaft 3, thereby to move the rack shaft 3 along the axial direction relatively to the ball screw nut 13. Therefore, the rotation of the ball screw nut 13 is converted to the axial movement of the rack shaft 3. When each of the plural balls 12 reaches to one connecting place P1 or P2 of one end of the rotating way L1, each ball 12 moves through the returning way L2 to be discharged to the other connecting place P2 or P1 so that each ball 12 moves from a down stream side to an upper stream side between the connecting places P1 and P2 being set in the rotating way L1. Each ball 12 does not receive any load in the returning way L2 on the contrary to receive load from the rack shaft 3 and the ball screw nut 13 in the rotating way L1. Each ball 12 moves by being pushed by next adjacent ball 12 backward of the ball circulating direction when the next adjacent ball 12 enters into the returning way L2 from the rotating way L1.

The ball screw mechanism 5 is constructed to have an unlimited circulating way to be able to circulate plural balls 12 between the rotating way L1 and the returning way L2 repeatedly and to convert the rotation of the ball screw nut 13 to the axial movement of the rack shaft 3 without any friction caused by direct contact between the ball screw nut 13 and the rack shaft 3.

In the ball screw equipment 5 of the first embodiment of the present invention, the returning way L2 includes a circulating member or deflector 15 for the ball screw nut 13 and the circulating member 15 has function dipping up each ball 12 from the rotating way L1 and function discharging each ball 12 to the rotating way L2 again. Therefore, the ball screw equipment 5 is constructed as the ball screw equipment using the deflector. The circulating member 15 in the first embodiment is manufactured by a method of Metal Injection Molding (MIM) to mold by injecting heated and melted metals to a molding die.

Figure 3:
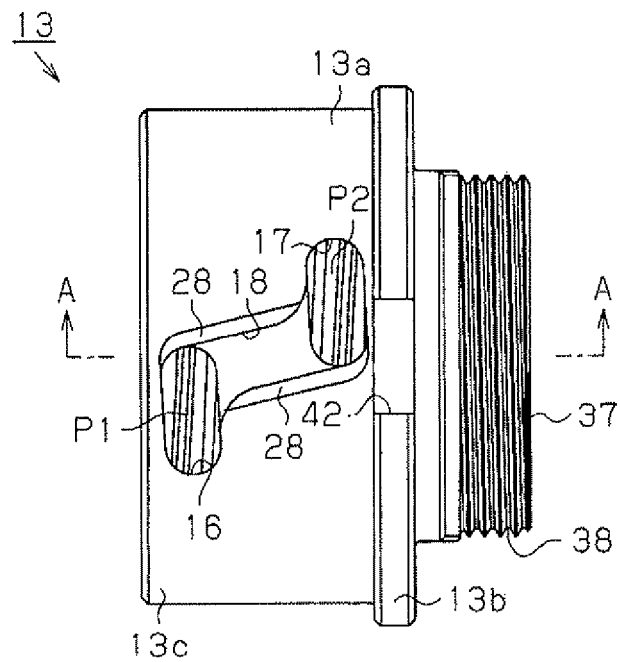
FIG. 3 is a plane diagram of a ball screw nut.
Figure 4:
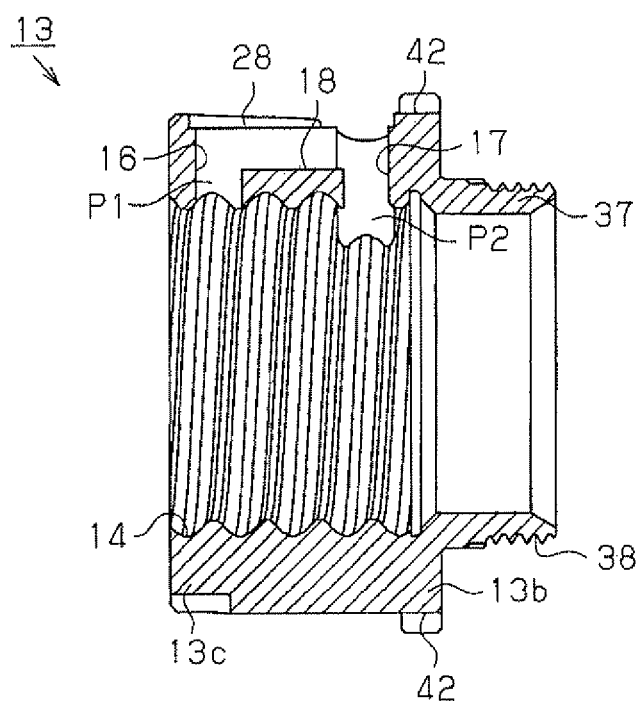
FIG. 4 is a cross sectioned diagram by A-A of a ball screw nut.
Figure 5:
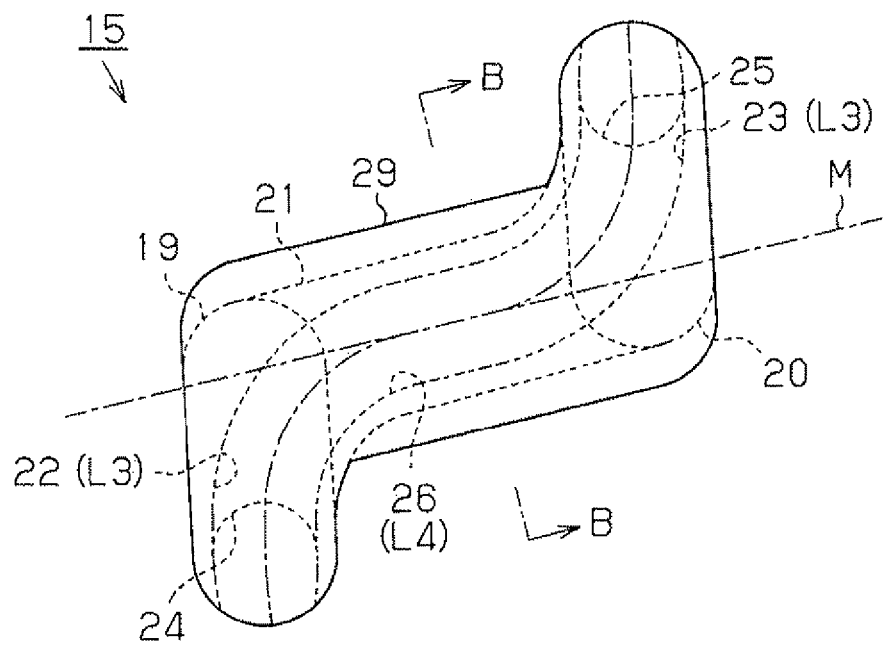
FIG. 5 is a plane diagram of a circulating member.

In detail as shown in FIG. 3 and FIG. 4, in the ball screw nut 13 is formed a pair of mounting holes 16, 17 penetrating the ball screw nut 13 in a radial direction at places referring to the above-identified tow connecting places P1, P2. Each of the connecting places P1, P2 is mounted at the places putting the plural lanes constructed by single continuous nut side screw grooves 14 therebetween along the axial direction of the ball screw nut 13, and single closed circulating way is formed by the rotating way L1 and the returning way L2 as shown in FIG. 2. Each of mounting holes 16, 17 has an oval or elliptic form in section and is formed in a different angle position shifting each other along a circumferential direction that is in an upper or a downer direction in FIG. 3. On an outer peripheral surface 13a of the ball screw nut 13 is removed a mounting recess 18 connecting between the mounting holes 16 and 17. The circulating member 15 provides a pair of inserted portions 19, 20 inserted into each of mounting holes 16, 17 and a communicating portion 21 communicating these inserted portions 19, 20 as shown in FIGS. 5, 6.

Each inserted potion 19 or 20 is formed as a hollow cylindrical form of the oval or ellipse corresponding to a sectional form of each mounting hole 16 or 17. The communicating portion 21 is formed between the inserted portions 19, 20 so as to connect base ends 19a, 20a of the inserted portions 19, 20, where the base ends 19a, 20a are above end portions of the inserted portions 19, 20 in FIG. 6. A shape of the communicating portion 21 is corresponded to that of the mounting recess 18 in order to be inserted into the mounting recess 18 in fit state as shown in FIGS. 3, 4.

The circulating member 15 is mounted in the ball screw nut 13 in a way that each inserted portion 19, 20 is respectively inserted into each corresponding mounting hole 16, 17 and the communicating portion 21 is mounted in fit state on the mounting recess 18 connecting each mounting hole 16, 17. The returning way L2 is constructed by first way L3 being formed by each of inserted portions 19, 20 inserted into each of mounting holes 16, 17, and by second way L4 formed by the communicating portion 21 being mounted on the mounting recess 18 in fit state by the way of inserting the circulating member 15.

Figure 6:
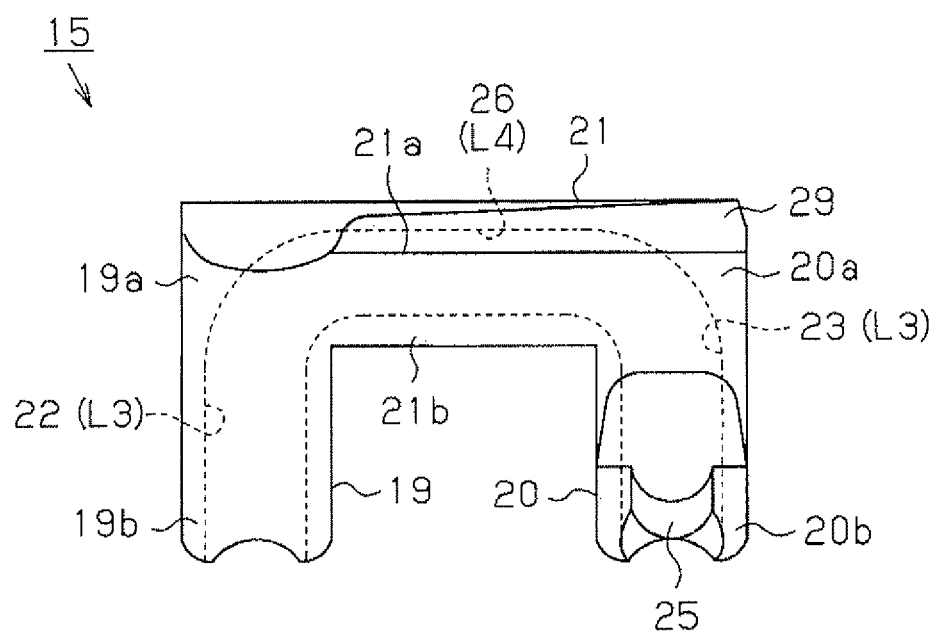
FIG. 6 is a side view diagram of a circulating member.
Figure 9:
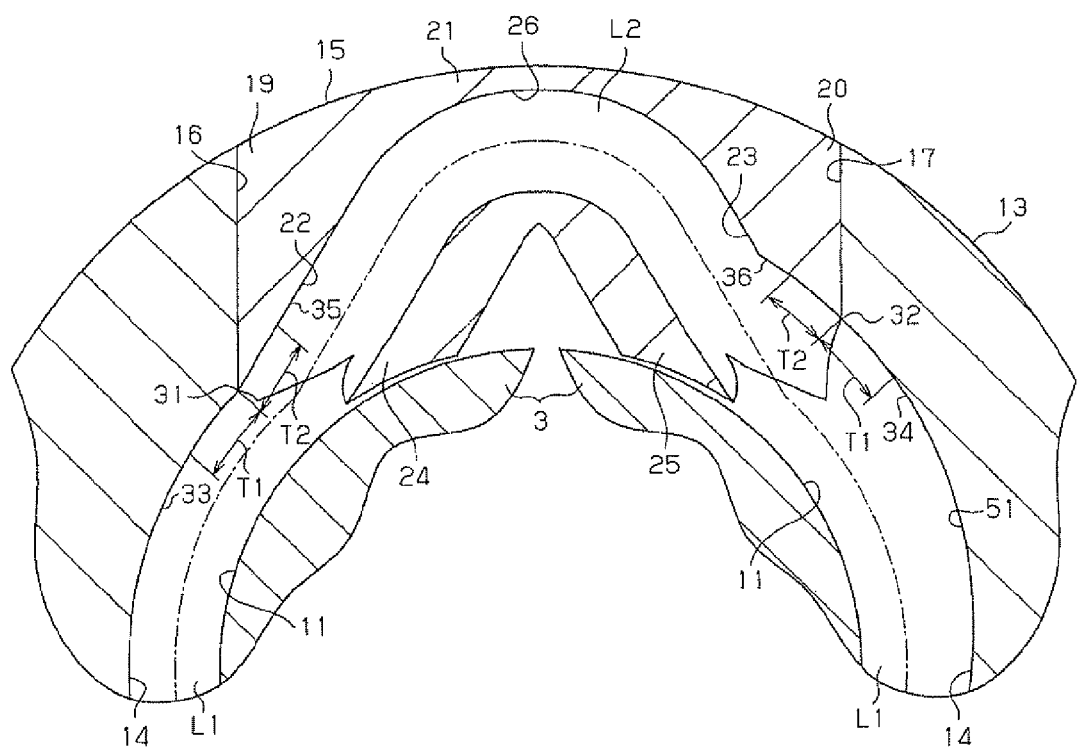
FIG. 9 is a schematic sectional diagram showing rack shaft, a circulating member and a ball screw nut along a ball circulating direction.

In each of the inserted portions 19, 20 is holed each of penetrating holes 22, 23 opening to a side of each of inserted ends 19b, 20b and extending from each of inserted ends 19b, 20b to each of base ends 19a, 20a, where the inserted ends 19b, 20b are shown at down side of inserted portions 19, 20 in FIG. 6. The first way L3 is constructed with the penetrating holes 22, 23. The first way L3 of the penetrating holes 22, 23 is smoothly curved over its whole length so that the first way L3 at a side of the base ends 19a, 20a is connected to the second way L4 formed in the communicating portion 21. In the inserted ends 19b, 20b are formed tongue portions 24, 25 dipping up each ball 12 rotating in rotating way L1 into the returning way L2, and the tongue portions 24, 25 are formed to project in order to be inserted into shaft side screw groove 11 of the rack shaft 3 as shown in FIG. 9.

The first way L3 formed in each inserted portion 19, 20 is connected with the rotating way L1 by a way that each of the inserted portions 19, 20 is inserted into each of the mounting holes 16, 17. Each ball 12 rotating in the rotating way L1 is dipped up by the tongue portions 24, 25 by the way of being pressed with the adjacent ball backward of the ball circulating direction, thereby to enter into the first way L3 of the returning way L2.

Figure 7:
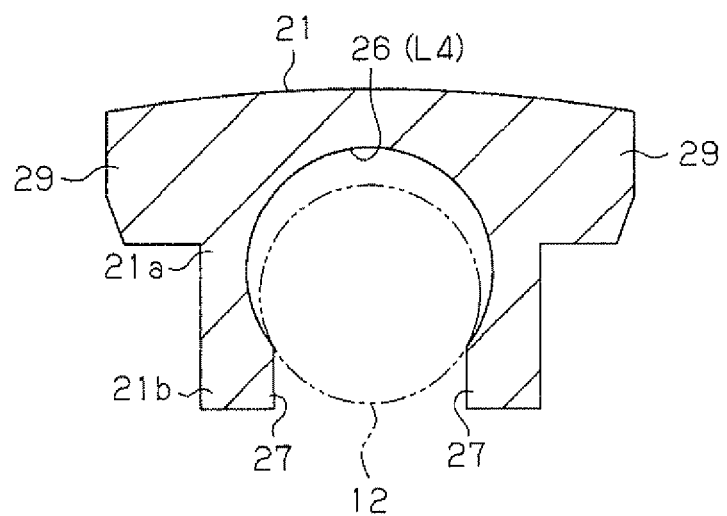
FIG. 7 is a cross sectioned diagram by B-B of a circulating member.

In the communicating portion 21 is formed a communicating groove 26 opening to the inserted end 21b of the communicating portion 21 as shown in FIG. 5 to FIG. 7. The inserted end 21b is a lower end portion shown in FIG. 7. The second way L4 including the communicating groove 26 is formed with approximate straight line along a line M of the communicating portion 21, thereby to be connected to the first way L3 formed at each of inserted ends 19b, 20b. A sectional area normal to an extending direction of the second way L4 is a circle form with a cut off portion being cut off a part of the inserted end 21b as shown in FIG. 7. In detail, each of a pair of flanges 27 is formed at each inserted ends 21b of the communicating portion 21 to be projected and faced inside of the communicating groove 26 and to extend along a longitudinal direction of the communicating groove 26, thereby to support each of balls 12 moving through the communicating groove 26 of the second way L4.

Figure 8:
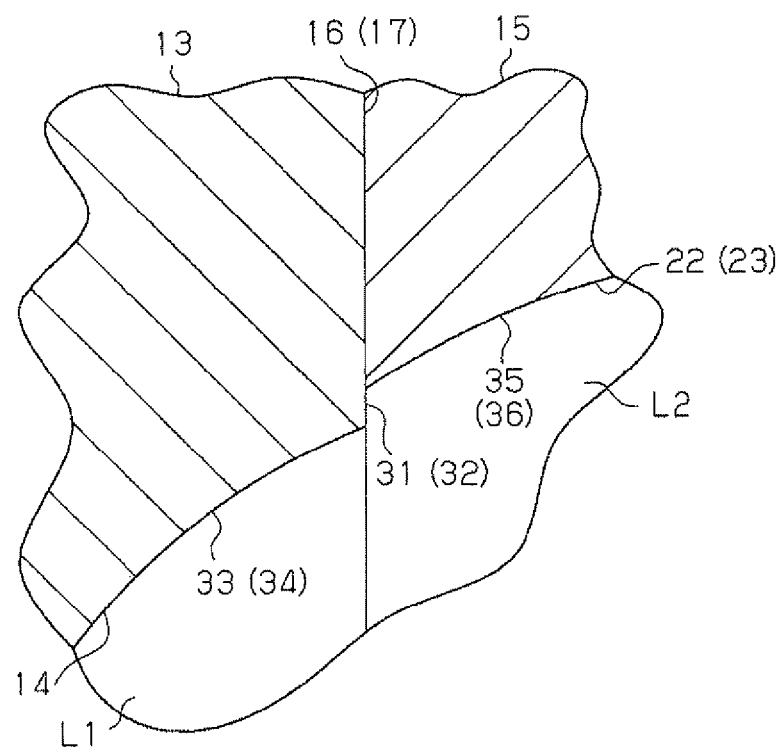
FIG. 8 is a schematic diagram showing a possible step at a jointing point of a rotating way and a returning way.

As shown in FIG. 3, in an outer peripheral surface 13a is formed a shallow groove 18 connecting to the mounting recess 18 and surrounding a fringe of the mounting recess 18. A flange 29 corresponding to the shallow groove 18 is formed at the base end 21a of the communicating portion 21 as shown in FIG. 5 and FIG. 6 where the base end 21a is shown in upper side of the communicating portion 21 in FIG. 6. The circulating member 15 inserted into the ball screw nut 13 is fixed to the ball screw nut 13 by caulking the flange 29 installed in the shallow groove 28 with a state that an outer peripheral surface of the flange 29 is aligned in a same level of the outer peripheral surface 13a of the ball screw nut 13. As shown in FIG. 8, it will be happened to appear some steps on jointing points 31, 32 between the rotating way L1 and the returning way L2 on a basis of figure accuracy of circulating member 15 and assembling accuracy to assemble to the ball screw nut 13 etc. The steps are therefore machined to be ground to minimum at faced places of connecting areas 33, 34 to the mounting holes 16, 17 as shown in FIG. 9. The connecting areas 33, 34 are formed on the nut side screw groove 14 to connect the rotating way L1 to the returning way L2. The machining process of grinding to the steps are performed within machining areas T1, T1 being set in the connecting areas 33, 34. The machining process of grinding at the steps are also performed within areas T2, T2 being set in the opening portions 35, 36 faced to the tongue portions 24, 25 of the penetrating holes 22, 23 of the inserted portions 19, 20 in order to make amounts of the steps minimum.

Only one end of the ball screw nut 13 is fixed to an end portion 6a of the motor shaft 6 in maintaining that the ball screw nut 13 is arranged coaxially to the rack shaft, as shown in FIGS. 2 to 4. The one end of the ball screw nut 13 is shown in right side of FIG. 2. From a fixed end portion 13b at a side of the one end of the ball screw nut 13 is extended a hollow fixed shaft 37 to axial direction. On an inner peripheral surface of the motor shaft 6 is formed a screw portion 39 corresponding to a screw portion 38 formed on an outer peripheral surface of the fixed shaft 37. The ball screw nut 13 is set by engaging the screw portion 38 of the fixed shaft 37 in mesh with the screw portion 39 of the motor shaft 6 in a state that only one end of the ball screw nut 13 is fixed to the end portion 6a of the motor shaft 6 and a free end of the ball screw nut 13 at its other end is not fixed. The free end is shown in left side of FIG. 2. As shown in FIG. 2, an approximately circular ring-like restricting member 41 is engaged in mesh with an outer peripheral surface of the end portion 6a of the motor shaft 6. A restricting portion 43 of the restricting member 41 is caulked to be fixed to engaging recess portions 42 formed on the fixed end portion 13b of the ball screw nut 13 in order to restrict a relative rotation between the ball screw nut 13 and the motor shaft 6.

The rotation of the motor 4 as a driving source is input into the ball screw equipment 5 by rotational movement of the ball screw nut 13 with the motor shaft 6 as a function of a single body. The EPS 1 drives the rotation of the ball screw nut 13 and transmits the torque of the motor 4 to axial pushing force so that the EPS 1 is constructed to supply assisting force to a steering system for assisting steering operation by a driver.

Next is explained a component restricting a ball clogging in the ball screw apparatus of the embodiment of the present invention.

The ball 12 is dipped up from the rotating way L1 by the tongue portions 24, 25 and introduced into the returning way L2, and moving direction of the ball 12 is suddenly changed around the jointing point 32 of the connecting area 34 where the ball 12 is discharged from the returning way L2 to the rotating way L1. There will be tendency to happen to clog the ball 12 around the jointing point 32 of the connecting area 34 because load is immediately increased by sandwiching by the shaft side screw groove 11 and the nut side screw groove 14 after the ball 12 is discharged from the returning way L2 to the rotating way L1.

Figure 10:
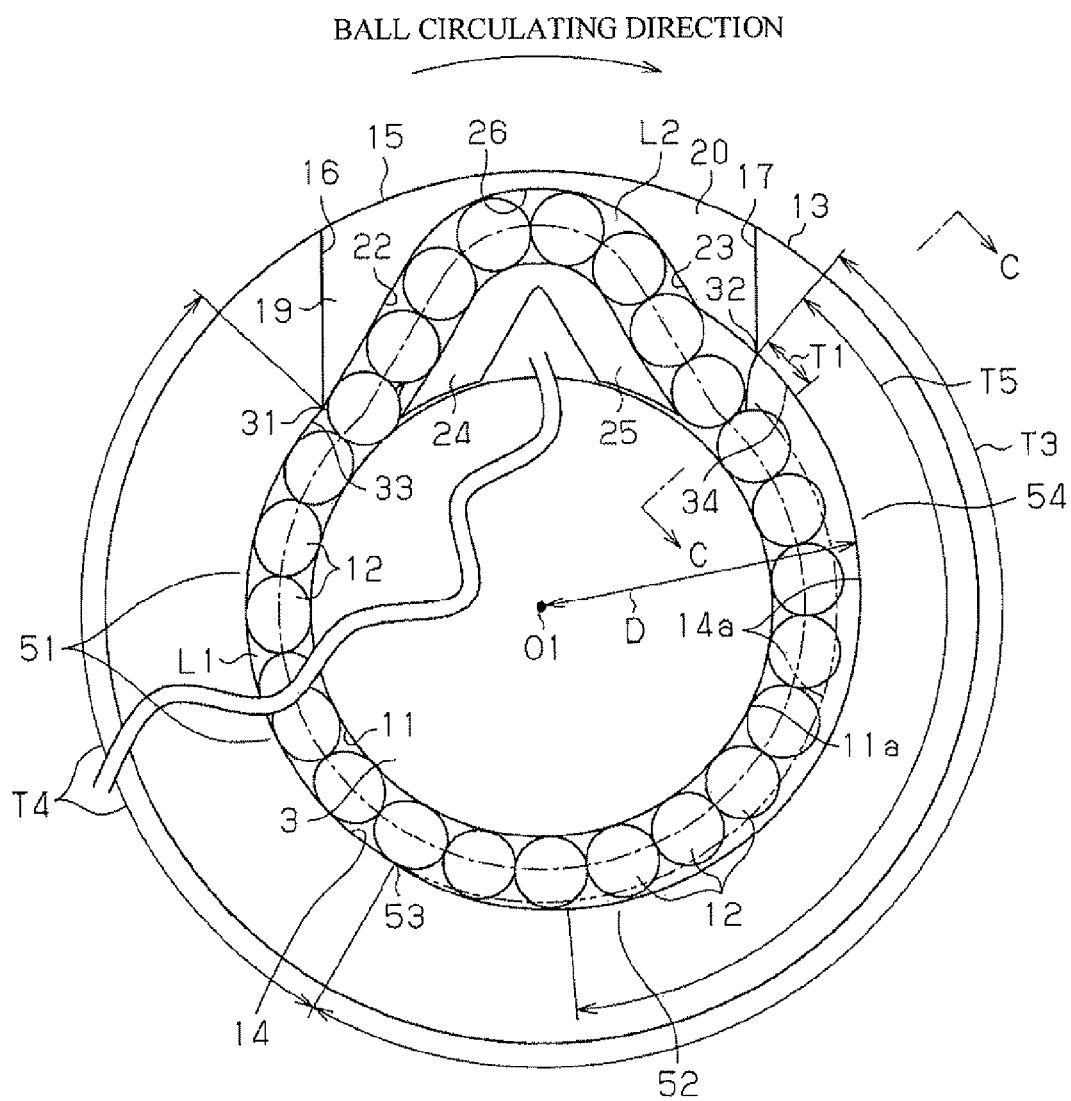
FIG. 10 is a schematic diagram showing rack shaft, a circulating member and a ball screw nut along a ball circulating direction in accordance with first embodiment of the present invention.
Figure 11:
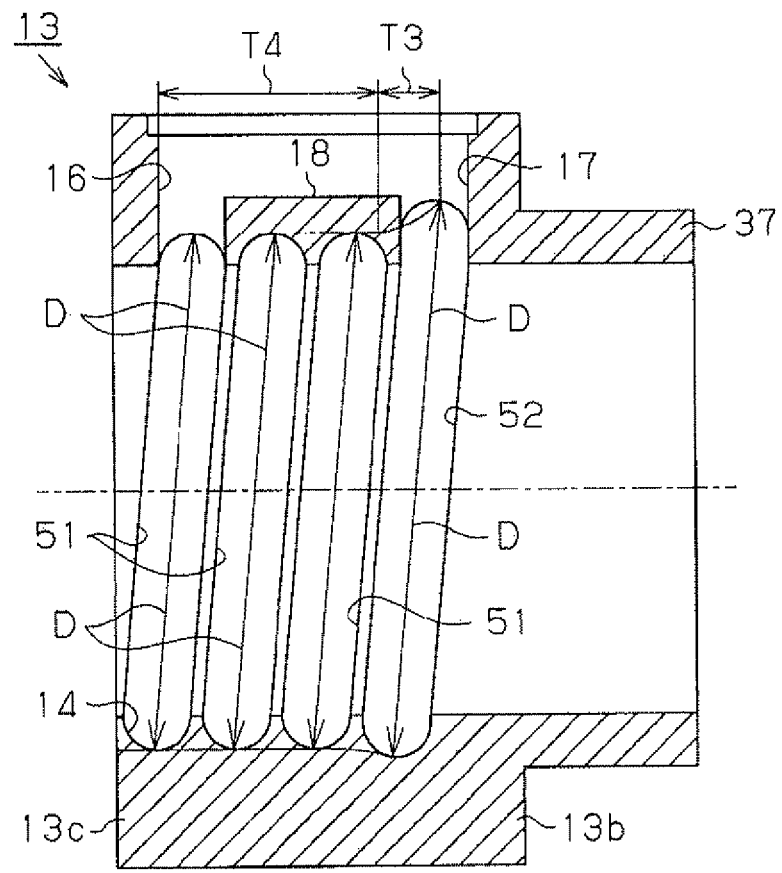
FIG. 11 is a schematic diagram of a ball screw nut showing a nut side screw groove in accordance with first embodiment of the present invention.
Figure 12:
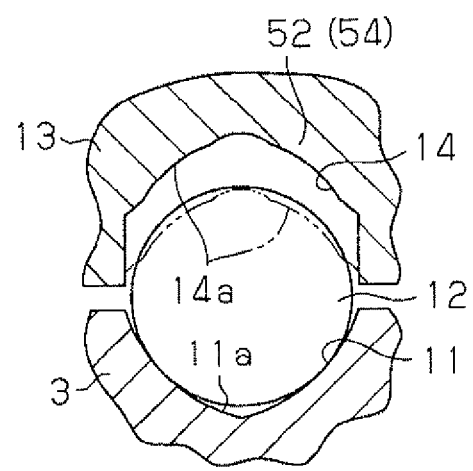
FIG. 12 is a cross sectioned diagram by C-C of a rack shaft and a ball screw nut.

Based on this tendency, the first embodiment of the present invention has a construction that the ball screw nut 13 includes a base portion 51 where a distance D from an axis center O1 of the rack shaft 3 to a bottom portion 14a of the nut side screw groove 14 is constant and an expanding portion 52 where the distance D is larger than that of the base portion 51 as shown in FIGS. 10 to 12. In other words, the distance D is formed to be constant at any extending position along an extending direction of the nut side screw groove 14 extending in spiral way within portions of the base portion 51 of the ball screw nut 13, and the distance D is formed to be larger than that of the base portion 51 at any extending position along an extending direction of the nut side screw groove 14 within parts of the expanding portion 52 of the ball screw nut 13. The expanding portion 52 is shown within a range indicated by "T3" in FIG. 10 and FIG. 11 and formed to include connecting area 34. The base portion 51 is shown within a range indicated by "T4" in FIG. 10 and FIG. 11 and is set in a way that the ball is put between the shaft side screw groove 11 and the nut side screw groove 14.

In FIG. 10 and FIG. 12, a position line of the bottom portion 14a in the expanding portion 52 equal to the distance D in the base portion 51 is indicated by a two-dot chain line as the range T3 wherein the expanding portion 52 is formed. In FIG. 10, the ball 12 is exaggeratingly illustrated to a deformed shape in order to show the deformation according to the load received by being sandwiched with the shaft side screw groove 11 and the nut side screw groove 14.

The expanding portion 52 is formed in the range including the machining area T1 formed at the side of the fixed end portion 13b of the ball screw nut 13 in the nut side screw groove 14, in other words including the connecting area 34 faced to the mounting hole 17 being set at the side of the fixed end portion 13b of the ball screw nut 13. The expanding portion 52 is formed in a way that the nut side screw groove 14 is expanded in a circular arc part having gradually and continuously increasing radius of the curvature according to approaching to the jointing point 32 from a boundary of the expanding portion 52 and the base portion 51 within a range that is a part of one circle from the jointing point 32 in the one embodiment of the present invention. The range of the part is approximate 180 degrees in clockwise direction from the jointing point 32 at a center of the axial center O1.

As shown in FIG. 10 and FIG. 12, the expanding portion 52 includes a non-contacting portion 54 where the ball 12 contacting with one of a bottom line 11a of the nut side screw groove 11 and a bottom line 14a of the nut screw groove 14 does not contact with the other of the bottom line 11a and the bottom line 14a in the one embodiment of the present invention. The non-contacting portion 54 is a range indicated by "T5" in FIG. 10. There is a clearance along a radial direction of the ball screw nut 13 between the bottom portion 14a of the nut side screw groove 14 and the ball 12 contacting with the bottom 11a of the shaft side screw groove 11. The radial direction of the ball screw nut 13 is a vertical direction in FIG. 12. The non-contacting portion 54 is continuously formed from the jointing point 32.

Figure 13:
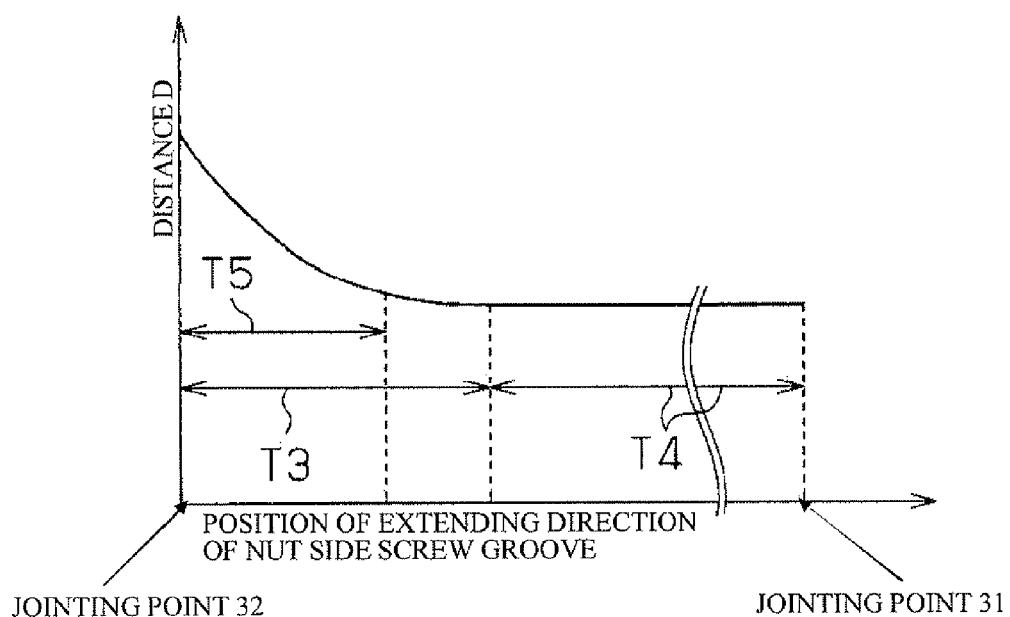
FIG. 13 is a graph showing a relationship between a distance D and a extending position from a jointing point in the nut side screw groove in first embodiment of the present invention.

Thereby, the expanding portion 52 is formed in a way that the distance D is gradually and continuously reduced in accordance with departing from the jointing point 32 along an extending direction of the rotating way L1 as shown in FIG. 13, that is along the circulating direction of the ball in FIG. 10. Whole of the expanding portion 52 in the range T3 is constructed as a gradual changing area where the direction D is gradually and continuously smaller in accordance that the ball advances from the jointing point 32 of the returning way L2 along the extending direction of the rotating way L1 in the one embodiment of the present invention. Generally speaking in the ball screw apparatus, the fixed end portion 13b of the ball screw nut 13 is fixed only as shown in FIG. 2 so that the ball screw nut 13 has a tendency that an amount of deformation of the free end portion 13c is larger than that of the fixed end portion 13b when the ball screw nut 13 is deformed by receiving load along the axial direction. Based on the larger deformation of the free end portion 13c of the ball screw nut 13 in the nut side screw groove 14, a space in the rotating way L1 has a tendency to become larger, thereby to reduce load received by the ball 12 in the rotating way L1 at the free end portion 13c. On the other hand, based on the smaller deformation of the fixed end portion 13b of the ball screw nut 13 in the nut side screw groove 14, a space in the rotating way L1 has a tendency not to become larger so that the ball 12 will have a tendency to receive relatively larger load in the rotating way L1 at the fixed end portion 13b.

On the other hand, in the ball screw apparatus 5 of the present invention in the one embodiment, the distance D in the expanding portion 52 of the rotating way L1 is formed as gradually and continuously large so that the space in the rotating way L1 in the expanding portion 52 is larger than that in the base portion 51. The load of the ball 12 received from the shaft side screw groove 11 and the nut side screw groove 13 in the expanding portion 52 is smaller than load of the ball 12 in the case that the distance D in the expanding portion 52 is equal to that in the base portion 51. It is restricted to increase rapidly the load received by the ball around the jointing point 32. The distance D is gradually and continuously reduced in accordance with approaching by the ball 12 from the jointing point 32 to a side of the base portion 51 so that the space in the rotating way L1 is gradually small in accordance with moving by the ball 12 to a direction apart from the returning way L2, thereby the load received by the ball 12 becomes larger gradually and continuously. The direction apart from the returning way L2 is a ball circulating direction in FIG. 10.

Figure 14:
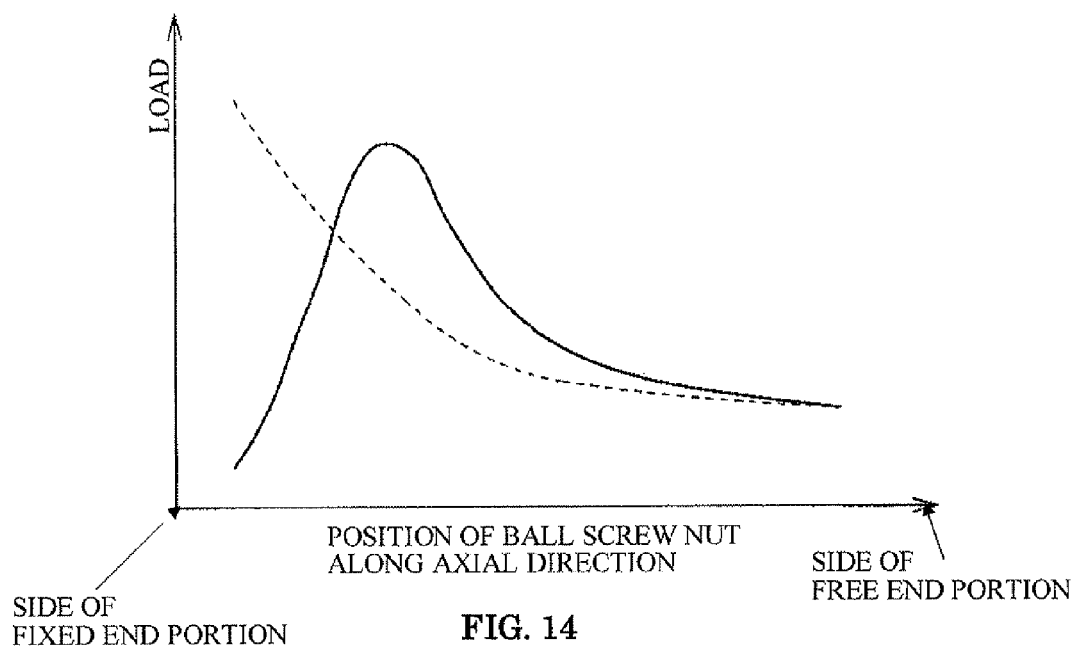
FIG. 14 is a graph showing a relationship between an axial directional position of a ball screw nut and load acted on a ball.

The load received by the ball 12, as shown in FIG. 14, is small at the side of the fixed end portion 13b in axial direction of the ball screw nut 13, and it is larger gradually in accordance with approaching to the free end portion 13c of the ball screw nut 13. The load received by the ball 12 in the nut side screw groove 14 is maximum in the base portion 51 adjacent to an end of the expanding portion 52 and then gradually reduced. The doted line shown in FIG. 14 is load received by the ball where there is no expanding portion 52 in the nut side screw groove 14. As explained above, the present invention in the first embodiment has next effects.

1. The ball screw apparatus 5 includes the returning way L2 formed by mounting the circulating member 15 in the mounted holes 16, 17 being formed in the ball screw nut 13. The ball screw nut 13 includes the base portion 51 having the constant distance D from the axial center O1 of the rack shaft 3 to the bottom portion 14a of the nut side screw groove 14, and the expanding portion 52 having the expanded distance D larger than the distance D in the base portion 51. The expanding portion 52 includes connecting area 34.

Based on the above-identified construction, the distance D at the connecting area 34 in the ball screw nut 13 is formed larger than that in the base portion 51. The load to the ball 12, therefore, does not increase rapidly at the connecting area 34, thereby to prevent the ball clogging effectively.

The ball screw apparatus 5 includes the base portion 14a having the constant distance D from the axial center O1 of the rack shaft 3 to the bottom portion 14a of the nut side screw groove 14. Thereby, the torque is firmly transmitted from the ball screw nut 13 to the rack shaft 3.

The ball screw apparatus in the prior art disclosed in the Japanese Patent 3381735 has a tendency to reduce a number of the ball contributing to the torque transmission where the load axially acting to the ball screw nut is small, thereby there is possibility to generate delay or shift at response of the screw shaft. On the other hands, the ball screw apparatus 5 of the present invention can contribute the torque transmission of the ball screw nut 13 by the ball 12 rotating in the base portion 51 without any relation to the amount of the load acting to the ball screw nut 13 axially. Thereby, it can be transmitted the torque of the ball screw nut 13 to the rack shaft 3 efficiently and stably.

2. The ball screw apparatus 5 includes the non-contacting portion 54 where the ball 12 does not contact with one of the bottom portion 11a of the shaft side screw groove 11 and the bottom portion 14a of the nut side screw groove 14 and the non-contacting portion 54 is continuously formed from the jointing point 32. In this construction, the ball 12 is not sandwiched between the shaft side screw groove 11 and the nut side screw groove 14 at the non-contacting portion 54. Each of the balls 12 is substantially in non-load status in the rotating way L1 constructed by the non-contacting portion 54 of the expanding portion 52. Since the non-contacting portion 54 is continuously formed from the jointing point 32, so that it can be surely restricted that the direction of movement of the ball 12 is suddenly changed and that the load acted to the ball 12 is rapidly increased. Thereby, the generation of the ball clogging is firmly stopped.

3. The ball screw apparatus 5 includes the expanding portion 52 having the distance D gradually and continuously reducing in accordance to approach to the base portion 51 from the jointing point 32. By this construction, the ball 12 exhausted from the returning way L2 to the rotating way L1 can make the load received from the shaft side screw groove 11 and the nut side screw groove 14 larger gradually, thereby to achieve still more restriction of the ball clogging.

4. In the ball screw apparatus 5, one pair of mounting holes 16, 17 are mounted at the position being spread over plural rows of nut side screw groove 14, and the ball screw nut 13 is fixed only at the fixed end portion 13b provided at one end of the ball screw nut 13. The expanding portion 52 includes the connecting area 34 facing to the mounting hole 17 at the fixed end portion 13b of the ball screw nut 13.

As explained above, since it is in general that the ball 12 in the rotating way L1 tends to receive larger load at the fixed end portion 13b than that at the free end portion 13c, the load received by the ball 12 tends to change rapidly when the ball 12 is discharged to a side of the fixed end portion 13b. On the other hands, by the above construction of the present invention it is possible to restrict the generation of the ball clogging effectively since it provides the expanding portion 52 being formed to include the connecting area 34 facing to the mounting hole 17 provided at the fixed end portion 13b.

5. In the ball screw apparatus 5, the expanding portion 52 is formed within one circle from the jointing point 32 continuously.

Since it is in general that the load received by the ball 12 at the rotating way L1 in the expanding portion 52 is small, it tends to reduce the efficiency of torque transmission by the ball screw apparatus. However by the above-identified construction in the ball screw apparatus 5 of the present invention, since the expanding portion 52 is formed within one circle from the jointing point 32 continuously, it is possible to restrict reduction of the torque transmission efficiency and to restrict generation of the clogging of the ball 12.

6. In the ball screw apparatus 5, the nut side screw groove 14 within one circle from the jointing point 32 continuously is formed as the shape of the arc part making in a way that the closer the distance from the jointing area 53 of the expanding portion 52 and the base portion 51 is, the larger the radius of the curvature of the nut side screw groove 14 is. By constructing the nut side screw groove 14 in the above-identified way, the expanding portion 52 is easily manufactured in reducing the distance in accordance with departing from the jointing point 32 to the direction of the extending of the rotating way L1.

Second embodiment of the present invention will be explained hereinafter referred to FIGS. Any constructions with same numerals in the second embodiment to that in the first embodiment will be omitted to be explained.

Figure 15:
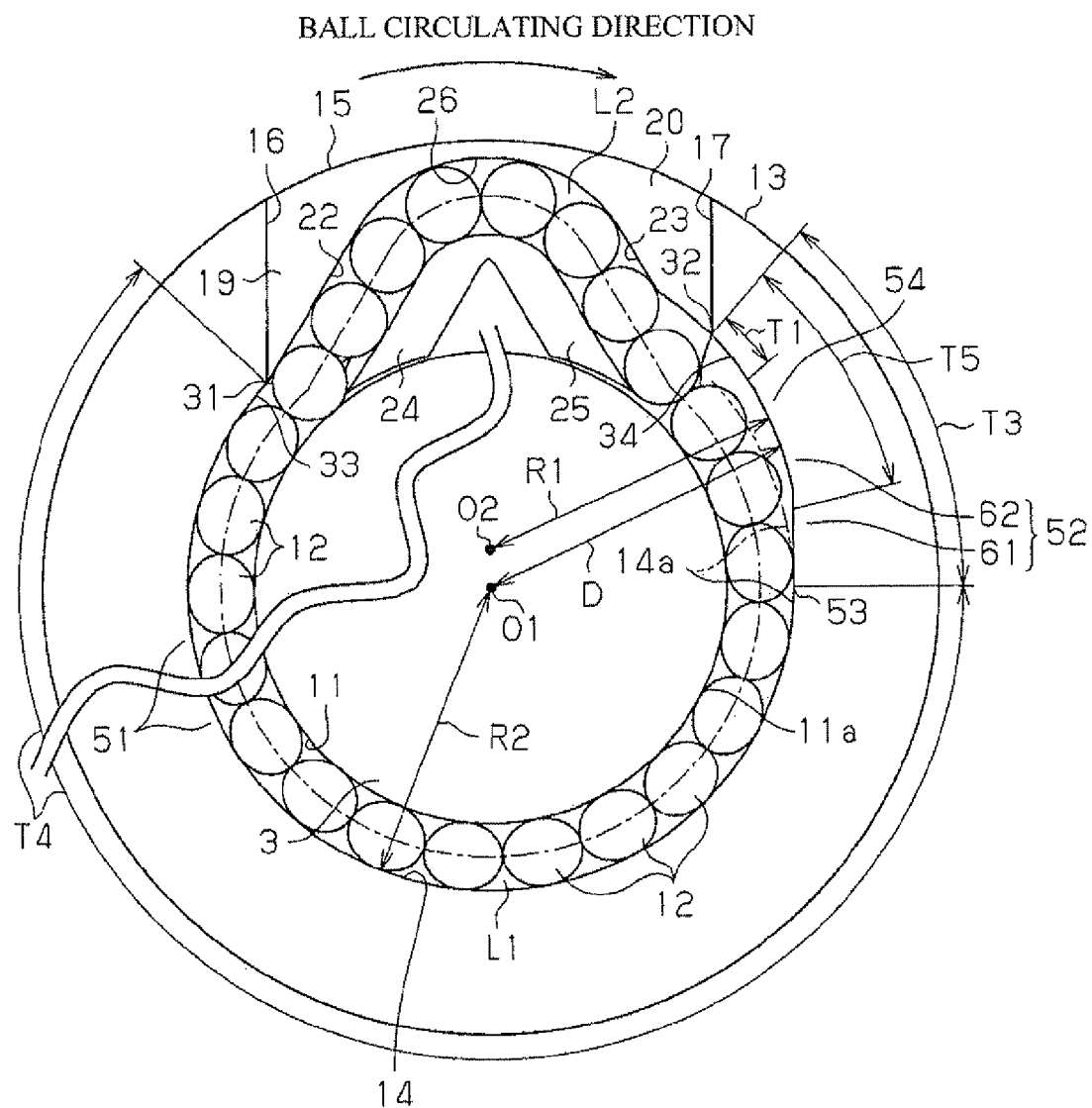
FIG. 15 is a schematic diagram showing rack shaft, a circulating member and a ball screw nut along a ball circulating direction in accordance with second embodiment of the present invention.

As shown in FIG. 15 the expanding portion 52 in the second embodiment includes the connecting area 34 in a way that a center O2 of the arc part that is offset to a direction of the circulating member 15 in relating to the shaft center O1 of the rack shaft 3. The connecting area 34 has the continuous arc part within one circle from the jointing point 32, in the second embodiment within 45 degrees clockwise around the shaft center O1.

The expanding portion 52 includes a straight section 61 and a curved section 62. The straight section 61 extends along a tangential direction from the jointing area 53 of the base portion 51 and the expanding portion 52 in the nut side screw groove 14. The curved section 62 continues to the straight section 61 and includes the connecting area 34. A radius R1 of the arc part constructed by the curved section 62 is equal to a radius R2 of a part constructed by the base portion 51. An amount of the radius R2 is equal to that of the distance D at the base portion 51 in the nut side screw groove 14. The ball 12 does not contact with one of the bottom portion 11a of the shaft side screw groove 11 nor the bottom portion 14a of the nut side screw groove 14 at a non-contacting area 54. The curved section 62A and a part of the straight section 61 are constructed as the non-contacting area 54 indicated as T5 in FIG. 15.

In the second embodiment in same way to the first embodiment, the expanding portion 52 is formed in a way that the distance D from the shaft center O1 to the bottom portion 14a is gradually and continuously reduced in accordance with departing from the jointing point 32 along an extending direction of the rotating way L1 as shown in FIG. 13, that is along the circulating direction of the ball in FIG. 15. Therefore, whole of the expanding portion 52 is constructed as the gradual changing area.

The second embodiment of the present invention has the same effects of the above-identified items 1 to 6 in the first embodiment and further next effect of item 7; 7. The center O2 of the arc part is offset to the direction of the circulating member 15 in relating to the shaft center O1, of the rack shaft 3. Therefore, the distance D is gradually and continuously reduced in accordance with separating from the jointing point 32 along the extending direction of the rotating way L1 so that manufacturing process of the expanding portion 52 is easy.

While the invention has been described in detail with reference to the preferred embodiments, it will be apparent to those skilled in the art that the invention is not limited to the present embodiments, and that the invention may be realized in various other embodiments within the scope of the claims.

Figure 16:
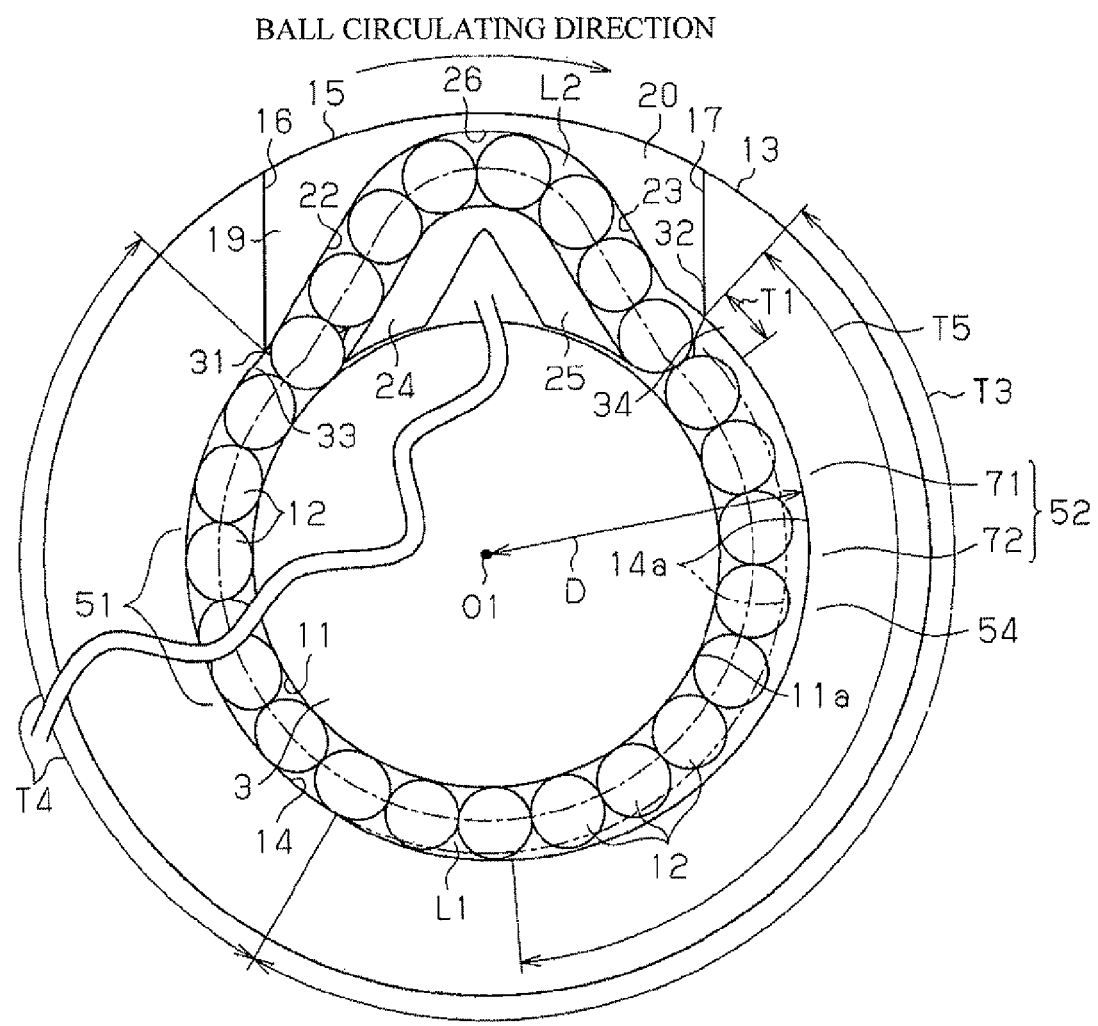
FIG. 16 is a schematic diagram showing rack shaft, a circulating member and a ball screw nut along a ball circulating direction in accordance with other embodiment.
Figure 17:
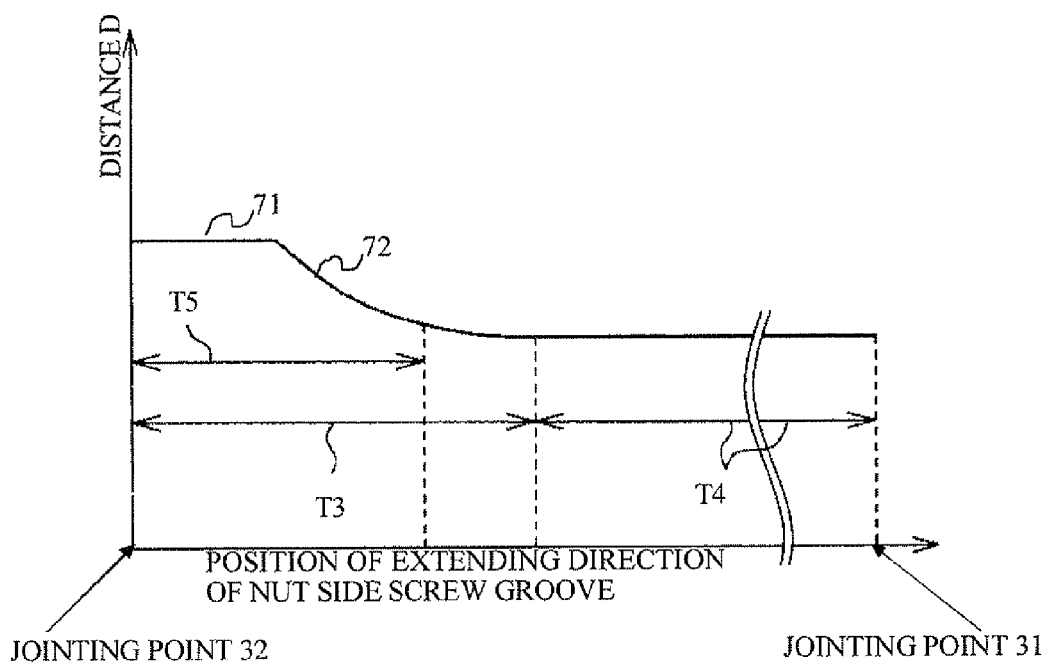
FIG. 17 is a graph showing a relationship between a distance D and a extending position from a jointing point in the nut side screw groove in first embodiment of the present invention.

For example, while whole of the expanding portion 52 is constructed as the gradual changing area having the distance D the distance of which is continuously reduced in accordance with separating from the jointing point 32 in the embodiments, however it may be constructed that the expanding portion 52 includes a constant distance area as well as the gradual changing area. As shown in FIGS. 16 and 17 the expanding portion 52 has a constant distance area 71 where the distance D is constant, and a gradual changing area 72 that is located adjacent to the base portion 51 and in which the distance is reduced in accordance with approaching to the base portion 51 from the jointing point 32.

While whole of the expanding portion 52 is constructed as the gradual changing area having the distance D the distance of which is gradually and continuously reduced in accordance with departing from the jointing point 32 in the first embodiment, however it may be constructed that the distance D is reduced in stepped way. It may be constructed that the distance D within whole of the expanding portion 52 is constant.

While the expanding portion 52 is constructed with the non-contacting portion 52 in the first embodiment, however it may be constructed that the non-contacting portion is not formed in the expanding portion 52. The ball 12 is kept to contact with the bottom portion 14a of the nut side screw groove 14 as well as the bottom portion 1 1a of the shaft side screw groove 11, but the distance D in the expanding portion 52 is gradually and continuously reduced from the jointing point 32 in keeping to make the ball 12 contact with the bottom portion 11a of the shaft side screw groove 11 and the bottom portion 14a of the nut side screw groove 14. This construction may be formed also in the second embodiment as the non-contacting portion 54 is not formed in the expanding portion 52.

While the expanding portion 52 is formed within one circle continuing from the jointing point 32, however it may be constructed that the expanding portion 52 is formed over greater area than the area within one circle. This construction may be formed also in the second embodiment as the expanding portion 52 is formed over greater area than the area within one circle.

While the center O2 of the arc part is offset to a direction of the circulating member 15 in relating to the shaft center O1 of the rack shaft 3 in the second embodiment, however it may be constructed that the center O2 of the arc part is offset to a direction of the circulating member 15 in relating to a center of the circumferential surface 13a of the ball screw nut 3. In this case, the ball screw nut 13 is fixed in a direction of the offset relative to the motor shaft 6 in order that the center of the circumferential surface 13a of the ball screw nut 3 is coincide to the shaft center O1 of the rack shaft 3.

While the machining process is performed to the connecting areas 33, 34 within the machining area T1 and the opening portions 35, 36 within the machining area T2, however it may be operated that the machining process is performed only to the connecting areas 33, 34 within the machining area T1 in the embodiments.

While the expanding portion 52 is formed at the side of the connecting area 34 faced to the mounting hole 17 mounted at the side of the fixed end portion 13b of the ball screw nut 13, however it may be constructed that the expanding portion 52 is formed at the side of the connecting area 34 faced to the mounting hole 17 mounted at the side of the free end portion 13e of the ball screw nut 13. It is better to form the expanding portion 52 in each of the connecting areas 33 and 34 in the ball screw apparatus disclosed in Tokkai 2010-71411 where the ball screw nut 13 is installed in the motor shaft 6.

While the present invention is applied to the ball screw apparatus 5 having the returning way L2 of one circulating member 15 in each of the embodiments, however it may be applied to the ball screw apparatus to each of plural independent circulating ways of plural circulating members as disclosed in Tokkai 11-270648.

While each of the embodiments of the present invention is applied to the ball screw apparatus 5 for the EPS, however it may be applied to a ball screw apparatus for other use than the EPS.

What is claimed is:

1. A ball screw apparatus comprising:
a screw shaft having a shaft side screw groove formed on an outer peripheral surface thereof;
a ball screw nut having a nut side screw groove formed on an inner peripheral surface thereof;
a plurality of balls installed in a spiral rotating way formed by facing said nut side screw groove to said shaft side screw groove; and
a circulating member mounted on a mounting hole formed in said ball screw nut and forming a returning way to connect one end and the other end of said rotating way, wherein
said nut side screw groove includes a connecting area connecting said rotating way to said returning way, wherein
said connecting area faced to said mounting hole in said nut side screw groove is machined to substantially eliminate possible steps at a jointing point of said rotating way and said returning way, wherein
said ball screw nut has a base portion and an expanding portion,
in said base portion a distance from an axis center of said screw shaft to a bottom portion of said nut side screw groove is constant in order to rotate said ball being put between said nut side screw groove and said shaft side screw groove,
in said expanding portion said distance is larger than that of the base portion, and
said expanding portion includes said connecting area.

2. The ball screw apparatus according to claim 1, wherein said expanding portion includes a gradual changing area being adjacent to said base portion and formed in a way that said distance is gradually and continuously reduced in accordance with approaching from said jointing point to said base portion.

3. The ball screw apparatus according to claim 2, wherein said expanding portion is formed within a range that is a part of one circle from said jointing point.

4. ball screw apparatus according to claim 3, wherein
said ball screw nut is fixed at one end thereof along an axial direction, and
said expanding portion is formed to include said connecting area mounted at a side of said one end of said ball screw nut.

5. The ball screw apparatus according to claim 4, wherein
said expanding portion includes a non-contacting area where said ball does not contact with one of said shaft side screw groove and said nut side screw groove, and
said non-contacting area is formed from said jointing point continuously.

6. The ball screw apparatus according to claim 2, wherein
said nut side screw groove is constructed with an arc part, and
said expanding portion is formed in a way that a center of said arc part is offset to a direction of said circulating member in relating to said shaft center of said screw shaft.

7. A ball screw apparatus comprising:
a screw shaft having a shaft side screw groove formed on an outer peripheral surface thereof;
a ball screw nut having a nut side screw groove formed on an inner peripheral surface thereof, said ball screw nut is fixed at one end thereof along an axial direction,
a plurality of balls installed in a spiral rotating way formed by facing said nut side screw groove to said shaft side screw groove; and
a circulating member mounted on a mounting hole formed in said ball screw nut and forming a returning way to connect one end and the other end of said rotating way, wherein
said nut side screw groove includes a connecting area connecting said rotating way to said returning way, wherein
said connecting area faced to said mounting hole in said nut side screw groove is machined to substantially eliminate possible steps at a jointing point of said rotating way and said returning way, wherein
said ball screw nut has a base portion and an expanding portion,
in said base portion a distance from an axis center of said screw shaft to a bottom portion of said nut side screw groove is constant in order to rotate said ball being put between said nut side screw groove and said shaft side screw groove, wherein
said expanding portion includes said connecting area mounted at a side of said one end of said ball screw nut, and a gradual changing area being adjacent to said base portion and formed within 180 degrees in a way that said distance is gradually and continuously reduced in accordance with approaching from said jointing point to said base portion, wherein
said expanding portion includes a non-contacting area where said ball does not contact with one of said shaft side screw groove and said nut side screw groove, and
said non-contacting area is formed from said jointing point continuously.

8. An electric power steering apparatus having a ball screw apparatus, wherein
said ball screw apparatus comprising:
a screw shaft having a shaft side screw groove formed on an outer peripheral surface thereof;
a ball screw nut having a nut side screw groove formed on an inner peripheral surface thereof;
a plurality of balls installed in a spiral rotating way formed by facing said nut side screw groove to said shaft side screw groove; and
a circulating member mounted on a mounting hole formed in said ball screw nut and forming a returning way to connect one end and the other end of said rotating way, wherein
said nut side screw groove includes a connecting area connecting said rotating way to said returning way, wherein
said connecting area faced to said mounting hole in said nut side screw groove is machined to substantially eliminate possible steps at a jointing point of said rotating way and said returning way, wherein
said ball screw nut has a base portion and an expanding portion,
in said base portion a distance from an axis center of said screw shaft to a bottom portion of said nut side screw groove is constant in order to rotate said ball being put between said nut side screw groove and said shaft side screw groove,
in said expanding portion said distance is larger than that of the base portion, and
said expanding portion includes said connecting area.

9. The electric power steering apparatus according to claim 8, wherein said expanding portion includes a gradual changing area being adjacent to said base portion and formed in a way that said distance is gradually and continuously reduced in accordance with approaching from said jointing point to said base portion.

10. The electric power steering apparatus according to claim 9, wherein said expanding portion is formed within a range that is a part of one circle from said jointing point.

11. The electric power steering apparatus according to claim 10, wherein
said ball screw nut is fixed at one end thereof along an axial direction, and
said expanding portion is formed to include said connecting area mounted at a side of said one end of said ball screw nut.

12. The electric power steering apparatus according to claim 11, wherein
said expanding portion includes a non-contacting area where said ball does not contact with one of said shaft side screw groove and said nut side screw groove, and
said non-contacting area is formed from said jointing point continuously.

13. The electric power steering apparatus according to claim 12, wherein said screw shaft is a rack shaft.

14. An electric power steering apparatus having a ball screw apparatus,
wherein said ball screw apparatus comprising:
a rack shaft having a shaft side screw groove formed on an outer peripheral surface thereof;
a ball screw nut having a nut side screw groove formed on an inner peripheral surface thereof, said ball screw nut is fixed at one end thereof along an axial direction,
a plurality of balls installed in a spiral rotating way formed by facing said nut side screw groove to said shaft side screw groove; and
a circulating member mounted on a mounting hole formed in said ball screw nut and forming a returning way to connect one end and the other end of said rotating way, wherein
said nut side screw groove includes a connecting area connecting said rotating way to said returning way, wherein
said connecting area faced to said mounting hole in said nut side screw groove is machined to substantially eliminate possible steps at a jointing point of said rotating way and said returning way, wherein
said ball screw nut has a base portion and an expanding portion,
in said base portion a distance from an axis center of said rack shaft to a bottom portion of said nut side screw groove is constant in order to rotate said ball being put between said nut side screw groove and said shaft side screw groove, wherein
said expanding portion includes said connecting area mounted at a side of said one end of said ball screw nut, and a gradual changing area being adjacent to said base portion and formed within 180 degrees in a way that said distance is gradually and continuously reduced in accordance with approaching from said jointing point to said base portion, wherein
said expanding portion includes a non-contacting area where said ball does not contact with one of said shaft side screw groove and said nut side screw groove, and
said non-contacting area is formed from said jointing point continuously.

15. An electric power steering apparatus having a ball screw apparatus,
wherein said ball screw apparatus comprising:
a rack shaft having a shaft side screw groove formed on an outer peripheral surface thereof;
a ball screw nut having a nut side screw groove formed on an inner peripheral surface thereof, said ball screw nut is fixed at one end thereof along an axial direction and said nut side screw groove is constructed with an arc part;
a plurality of balls installed in a spiral rotating way formed by facing said nut side screw groove to said shaft side screw groove; and
a circulating member mounted on a mounting hole formed in said ball screw nut and forming a returning way to connect one end and the other end of said rotating way, wherein
said nut side screw groove includes a connecting area connecting said rotating way to said returning way, wherein
said connecting area faced to said mounting hole in said nut side screw groove is machined to substantially eliminate possible steps at a jointing point of said rotating way and said returning way, wherein
said ball screw nut has a base portion and an expanding portion,
in said base portion a distance from an axis center of said rack shaft to a bottom portion of said nut side screw groove is constant in order to rotate said ball being put between said nut side screw groove and said shaft side screw groove, wherein
said expanding portion is formed in a way that a center of said arc part is offset to a direction of said circulating member in relating to said shaft center of said rack shaft, wherein
said expanding portion includes said connecting area mounted at a side of said one end of said ball screw nut, and a gradual changing area being adjacent to said base portion and formed within 45 degrees in a way that said distance is gradually and continuously reduced in accordance with approaching from said jointing point to said base portion, wherein
said expanding portion includes a non-contacting area where said ball does not contact with one of said shaft side screw groove and said nut side screw groove, and
said non-contacting area is formed from said jointing point continuously.

* * * * *